US008026321B2

(12) United States Patent
Liu et al.

(10) Patent No.: US 8,026,321 B2
(45) Date of Patent: Sep. 27, 2011

(54) ADHESIVE OF EPOXY COMPOUND, EPOXY-REACTIVE MONOMER AND TRI- AND TETRA-FUNCTIONAL ACRYLATE ACCELERATORS

(75) Inventors: Wen-Feng Liu, Naperville, IL (US); Barbara Bucquet, Valence (FR); Barbara Chabut, Valence (FR)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/778,481

(22) Filed: Jul. 16, 2007

(65) Prior Publication Data
US 2009/0131608 A1 May 21, 2009

Related U.S. Application Data

(62) Division of application No. 10/946,191, filed on Sep. 21, 2004, now Pat. No. 7,244,793.

(60) Provisional application No. 60/506,441, filed on Sep. 26, 2003.

(51) Int. Cl.
C08L 33/14 (2006.01)
C08L 63/00 (2006.01)
C08L 63/02 (2006.01)
C08L 63/04 (2006.01)
C08L 63/10 (2006.01)

(52) U.S. Cl. ......... 525/532; 525/259; 525/423; 525/502
(58) Field of Classification Search .................. None
See application file for complete search history.

(56) References Cited

U.S. PATENT DOCUMENTS

| 3,066,112 | A | 11/1962 | Bowen |
| 3,256,226 | A | 6/1966 | Fekete et al. |
| 3,317,465 | A | 5/1967 | Doyle et al. |
| 3,345,401 | A | 10/1967 | May |
| 3,373,221 | A | 3/1968 | May |
| 3,377,406 | A | 4/1968 | Newey et al. |
| 3,432,478 | A | 3/1969 | May |
| 3,548,030 | A | 12/1970 | Jernigan et al. |
| 3,564,074 | A | 2/1971 | Avallone et al. |
| 3,634,542 | A | 1/1972 | Dowd et al. |
| 3,637,618 | A | 1/1972 | May |
| 4,051,195 | A * | 9/1977 | McWhorter ............... 528/106 |
| 4,383,090 | A * | 5/1983 | Slocki et al. ............... 525/502 |
| 4,651,875 | A | 3/1987 | Lang et al. |
| 4,689,389 | A * | 8/1987 | Lee et al. ............... 528/109 |
| 4,706,806 | A | 11/1987 | Mauthe |
| 4,729,696 | A | 3/1988 | Goto et al. |
| 4,766,186 | A * | 8/1988 | Sellstrom et al. ............... 525/532 |
| 4,803,232 | A * | 2/1989 | Shah ............... 523/456 |
| 4,910,269 | A * | 3/1990 | Waddill ............... 525/532 |
| 4,935,454 | A | 6/1990 | Koblitz et al. |
| 4,944,819 | A | 7/1990 | Gebauer |
| 5,891,942 | A | 4/1999 | Parish et al. |
| 5,972,563 | A * | 10/1999 | Steinmann et al. ........ 430/280.1 |
| 6,015,845 | A | 1/2000 | Yonetani et al. |
| 6,291,555 | B1 * | 9/2001 | Surjan et al. ............... 523/443 |
| 6,420,496 | B1 * | 7/2002 | Moon et al. ............... 525/504 |
| 6,583,259 | B1 | 6/2003 | Weber et al. |
| 6,939,610 | B1 * | 9/2005 | Kaul ............... 428/403 |
| 7,544,739 | B2 | 6/2009 | Liu et al. |
| 2002/0010282 | A1 | 1/2002 | Kish et al. |
| 2003/0181571 | A1 | 9/2003 | Kish et al. |
| 2004/0176550 | A1 * | 9/2004 | McQuaid ............... 525/530 |
| 2009/0215964 | A1 | 8/2009 | Chabut et al. |

FOREIGN PATENT DOCUMENTS

| DE | 3617702 | C2 | 12/1987 |
| EP | 66447 | A1 * | 8/1980 |
| EP | 66447 | A1 | 12/1982 |
| EP | 0150555 | B1 | 8/1985 |
| EP | 0534197 | | 3/1993 |
| EP | 0199671 | | 10/1993 |
| EP | 0589831 | A1 | 3/1994 |
| EP | 703197 | | 3/1996 |
| EP | 0708258 | A2 | 4/1996 |
| EP | 875546 | | 11/1998 |
| EP | 1424378 | A | 6/2004 |
| GB | 2068001 | A * | 8/1981 |
| JP | 57-100126 | A * | 6/1982 |
| JP | 62-57430 | A * | 3/1987 |
| JP | 2-269782 | A * | 11/1990 |
| JP | 08-295864 | | 11/1996 |
| JP | 08-325358 | | 12/1996 |
| JP | 09 296027 | | 11/1997 |
| JP | 10-182938 | A * | 7/1998 |
| JP | H10-182938 | | 7/1998 |
| JP | 2002-53668 | | 2/2002 |
| JP | 2002-53668 | A * | 2/2002 |

OTHER PUBLICATIONS

CAPLUS accession No. 1992:450815 for the Toso to Toryo article by Mine, 1992, three pages.*
Sartomer bulletin for SR-351 trimethylolpropane triacrylate, 1998, seven pages.*
Vieweg et al. (Ed.), Plastics Handbook vol. VIII Polyesters, Carl Hanser Verlag, Munich, 1973, pp. 276 and 278. (English translation).
http://lexikon.meyers.de/wissen/Phenolharze+%28Sachartikel%29, Nov. 20, 2008. (English translation).
http://lexikon.meyers.de/medien/Phenolharze+%28Grafiken%29+Chemie, Nov. 20, 2008. (English translation).
Iijima et al., Modification of Epoxy Resins with Poly(aryl ether ketone)s, J. Appl. Polymer Science, vol. 43, 1991, pp. 1685-1692.
ES-report ESR-1562, Dec. 2004, pp. 1 to 5, http://www.us.hilti.com/data/techlib/docs/approvals-listings-reports/icbo/ESRHITTZ.pdf.
Material Safety Data Sheet Hilti HIT-HY150 of Dec. 20, 2002.

(Continued)

Primary Examiner — Robert Sellers
(74) Attorney, Agent, or Firm — Bell & Manning, LLC

(57) ABSTRACT

Adhesive compositions comprising epoxy resins, including epoxy novalac resin, and at least one reactive multi-functional acrylate. In preferred embodiments, the compositions also include amine-curing agent having at least one a cyclic group. The adhesive compositions according to the present invention are capable of enhancing the bonding strength of the adhesive, particularly at relatively high temperatures, such as at about 80° C.

15 Claims, No Drawings

OTHER PUBLICATIONS

Encyclopedia of Chemical Technology, Fourth Edition, vol. 19; John Wiley & Sons, New York etc., 1996, pp. 654-656.

Encyclopedia of Chemical Technology, Fourth Edition, vol. 22, John Wiley & Sons, New York etc., 1997, pp. 984-985.

Cowie, Chemistry Physics of Modern Materials, 2nd edition, Blackie Academic and Professional/Chapman & Hall, Glasgow, 1991 (reprint 1994), pp. 345-346.

English translation of Office Action received in JP20060528145, Oct. 5, 2010.

* cited by examiner

US 8,026,321 B2

ADHESIVE OF EPOXY COMPOUND, EPOXY-REACTIVE MONOMER AND TRI- AND TETRA-FUNCTIONAL ACRYLATE ACCELERATORS

CROSS-REFERENCE TO RELATED APPLICATION

The present application is related to and claims the priority benefit of U.S. provisional application 60/506,441, filed Sep. 26, 2003, the entirety of which is incorporated herein by reference.

FIELD OF THE INVENTION

The present invention relates to curable adhesive compositions. More specifically, the invention relates to curable adhesive compositions that are particularly well adapted for anchoring materials in or to concrete or masonry. Thus, certain aspects of the invention relate to epoxy-based systems and methods for anchoring materials in or to concrete or masonry, while others relate to curable epoxy adhesive compositions, while still others relate to the bonded structures produced using such compositions and/or methods.

BACKGROUND OF THE INVENTION

Many applications require that one article, structure or item be bonded or adhered to another article, structure or item. For example, anchor bolts are employed in various fields of engineering and construction as strengthening or reinforcing members in rock formations, or concrete or masonry structural bodies. The bolts, which are typically metallic, are inserted into holes, gaps or openings in the rock formations, or concrete or masonry structural bodies, and are fixed or anchored therein by means of an anchor composition. Objects that have been attached to concrete or masonry using anchor bolts include, but are not limited to, electrical conduits, panels, piping and wall sections. Adhesive anchors are preferred over mechanical anchors for anchoring in soft concrete or masonry because, among other reasons, adhesive anchors place less stress on the concrete or masonry. As used herein, the term "masonry" shall include, but is not limited to, stone, brick, ceramic tile, cement tile, hollow concrete block and solid concrete block. Typically, the anchor composition cures or hardens (polymerizes) to form a strong bond between the rock formation, or the concrete or masonry structural body, and the bolt.

It has been known to use curable synthetic resins as the primary adhesive for the safe fastening of anchoring rods, bolts and similar devices in solid rock, masonry, concrete and the like. Typically, but not exclusively, certain of the starting components of the adhesive composition are kept separate from one another and then combined at or near the point of fastening. In such so called two part systems, the components which are kept separate until the time of use are combined at the site and then introduced to the anchor bolt, the bore or hole prepared to receive the bolt, or both. Thus, the formation of the cured adhesive body that binds the fastener to the base structure is initiated at about the time the fastener is placed in its final position.

A useful anchor composition should provide a strong bond between the concrete or masonry and the material to be anchored to the concrete or masonry, be easy to dispense at the location of use, and is preferably not noxious or offensive to the user. It is also preferred in certain embodiments that the adhesive is capable of achieving a substantial portion of its ultimate strength in a relatively short period of time. This last feature can be critically important to the commercial success of the adhesive since it can allow a construction project to proceed at an efficient and profitable pace. Moreover, applicants have noted that in many applications it is desirable for the adhesive to be capable of achieving good bonding properties even if it is used or applied during inclement weather, during cold weather, or under other conditions, which produce substantial moisture and/or low temperatures at the bond site.

Many of the curable adhesive compositions currently used in the industry, and in particular the field of anchoring in or to concrete, rock, and like materials, are based on compounds that are polymerized or cured by condensation and/or ring-chain conversion polymerization of monomers, oligomers, prepolymers and like compounds that have at least one functional group, typically at least one functional group along the polymer backbone, such as hydroxyl groups, and at least one terminal functional group, such as oxide groups. For example, epoxy-based adhesive compositions are typically cured by one or more of these mechanisms. The epoxy resin and a curing or hardening agent are typically mixed immediately prior to use, and cure within a certain amount of time.

SUMMARY OF THE INVENTION

Applicants have come to appreciate a need in the art for adhesive compositions with excellent physical and processing characteristics. In view of applicants' appreciation of this need and the recognition by applicants of certain deficiencies in the prior art, applicants have discovered that the performance of many types of adhesive compositions, but preferably adhesives cured by condensation and/or ring-chain conversion polymerization, such as, for example epoxy resins, can be dramatically improved by incorporating into the adhesive formulation an accelerator comprising at least one reactive multi-functional acrylate, and in certain embodiments multi-functional alkylacrylate, and more preferably C1-C4 alkylacrylate. Applicants have found that the incorporation of reactive multi-functional acrylate into adhesive compositions according to the present invention is capable of enhancing the bonding strength of the adhesive, particularly at relatively high temperatures, such as at about 80° C. In certain embodiments, the present invention provides an adhesive that is relatively odorless, is readily injectable at relatively low temperatures, such as at about 5° C., and has a relatively fast cure time.

In certain embodiments, the epoxy of the present composition preferably comprises an epoxy containing at least one cyclic group, such as a novalac epoxy. Furthermore, and particularly in embodiments in which the epoxy comprises a cyclic group, it is preferred that the composition further comprises at least one amine curing agent. In certain highly preferred embodiments, the compositions comprise an novalac epoxy and at least one amine curing agent, with the amine preferably also containing a cyclic group, even more preferably an amine containing a C4-C8 cyclic group.

DETAILED DESCRIPTION OF PREFERRED EMBODIMENTS

While it is contemplated that the reactive multi-functional acrylate accelerator of the present invention may be used to best advantage in adhesives based on condensation and/or ring-chain conversion polymerization, it is believed that use of the reactive multi-functional acrylate may also provide substantial benefit to adhesives generally, including those adhesives which undergo free radical vinyl addition polymerization, acid catalyzed vinyl addition polymerization, base catalyzed vinyl addition polymerization, and combinations of two or more of any of these forms of polymerization.

In certain preferred embodiments, however, the present invention provides epoxy-based adhesive compositions, systems and methods that utilize at least one reactive multifunctional acrylate accelerator. As used herein the term "reactive multifunctional acrylate" refers to compounds that have at least two acrylate functionalities that are reactive, under the conditions used to cure the adhesive, with at least one of the compounds involved in the curing reaction or formed by the curing reaction. As used herein, the term "acrylate functionality" refers to a functional group having the general structure illustrated below:

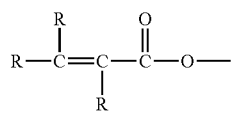

where R may be any group which does not substantially interfere with or prevent reaction of the multifunctional acrylate compound with the polymerizable resin. In preferred embodiments, R is independently H or a substituted or unsubstituted alkyl, aryl, oxyalkyl, arylalkyl, or oxyalkylaryl. In highly preferred embodiments each R is H.

The preferred epoxy-based adhesive compositions of the present invention have a cure time of about three (3) hours or less and achieve a 24 hour no-torque pull-out strength of at least about 85 KN at about 72° F. As used herein the term "cure time" refers to the time it takes from the initiation of curing reaction for the curable adhesive composition to achieve about 80% of its ultimate load capacity or strength under substantially dry conditions, with ambient temperature at about 72° F. As used herein, the term "no torque pull-out strength" refers to the pullout strength of the adhesive measured at a time and under conditions in which there has been no substantial preceding torque applied to the bolt being tested. The preferred compositions of the present invention also achieve a 24 hour torqued pullout strength of at least about 50 KN at about 72° F. For the purposes of convenience, the term "room temperature" is used herein to refer to a temperature of 72° F. As used herein, the term "torqued pull-out strength" refers to the pullout strength of the adhesive measured at a time, which is subsequent to the application of sufficient torque to begin turning of the bolt within the hole. The preferred compositions of the present invention also achieve a 1-hour torque resistance of at least about 15 N-m at about 72° F. The techniques used for measuring pullout force and torque resistance are described in the Experimental Protocol section hereof.

The present compositions and systems also preferably are substantially free of offensive odors, as would be produced by the presence of substantial amounts of mercaptans in the formulation.

I. The Compositions, Methods and Systems

It is contemplated that the present compositions can be provided as one-part or multi-part compositions, depending upon many factors particular to the expected use. In certain preferred embodiments, the present invention provides a composition, preferably for use in systems and methods for anchoring materials in or to concrete or masonry, that comprises a first composition and a second composition that are brought together at or about the time of use. Preferably in such embodiments the first composition comprises a resin component, preferably at least one epoxy resin, and at least one reactive multi-functional acrylate accelerator, and the second composition includes a hardening or curing agent, said hardening or curing agent preferably comprising at least one amine-curing agent. In such embodiments, the first and second compositions are brought into intimate contact to form a curable adhesive composition.

Applicants have found that exceptional results can be achieved in accordance with the present invention by use of the present reactive multifunctional acrylate with polymerizable resins comprising, and preferably consisting essentially of, polymerizable epoxy compounds, optionally but preferably in combination with a select reactive diluent for the polymerizable epoxy compound. In preferred embodiments, the reactive diluent comprises one or more compounds which have at least one oxide ring reactive with the polymerizable epoxy and which are compatible with the reactive multifunctional acrylate. In certain highly preferred aspects of the present invention, the reactive diluent comprises a diglycidal ether. Depending upon the particular application and desired end properties of the adhesive composition, the reactive diluent of the present invention may or may not constitute an epoxy compound in accordance with the present invention. It is sometimes common practice to refer to such a combination of polymerizable polymer and reactive diluent as a "resin," and such terminology will sometimes be used herein to refer to such combinations.

It is contemplated that the relative amounts of the components in the present compositions can vary widely depending on the particulars of the contemplated use, and all such variety is within the scope hereof. Applicants have discovered, however, that in many embodiments unexpectedly superior performance is possible when multi-functional acrylate compound(s) are present in the adhesive compositions in amounts of from about 5 wt % to about 25 wt %, more preferably from about 8 wt % to about 20 wt %, and even more preferably from about 10 wt % to about 15 wt %. In certain preferred embodiments, multi-functional acrylate compound(s) are present in the adhesive compositions in amounts of from about 14 wt % to about 18 wt %. Applicants have found that at least in certain cases it may be beneficial to consider the amount of the multifunctional acrylate used relative to the active components in the formulation. In certain preferred adhesive compositions, for example, the multi-functional acrylate compound(s) are present in the adhesive composition in amounts of from about 5 pbwa to about 25 pbwa, more preferably about 10 pbwa to about 20 pbwa and even more preferably from about 15 pbwa to about 20 pbwa. The term "pbwa" as used herein means "part by weight based on active components." As used herein, the term "active components" refers to those components of the composition which participate in the curing of the composition, either directly as a reactant or indirectly as a catalyst, curing agent, accelerator, inhibitor and the like. Furthermore, unless otherwise specifically indicated to the contrary, the weight percentages and pbwa of the components in the present adhesive compositions as specified herein refer to the composition after it has been formulated for use in bonding. Thus, for two part compositions of the type described hereinafter, the percentages and pbwa values refer to the adhesive composition based on the combination of parts A and B of such compositions, unless otherwise specifically noted. In certain preferred embodiments, the multi-functional acrylate compound(s) are present in the adhesive composition in amounts of from about 15 pbwa to about 25 pbwa.

The resin component, and particularly the polymerizable epoxy compound(s) plus any reactive diluent, is preferably present in the adhesive compositions of the present invention in amounts of from about 15 wt % to about 50 wt %, more preferably from about 25 wt % to about 45 wt %, and even more preferably from about 25 wt % to about 40 wt %, particularly when such resin includes a reactive diluent, preferably a diglycidyl ether. In certain preferred embodiments, the resin component, and particularly the polymerizable epoxy compound(s) plus any reactive diluent, is present in the adhesive compositions of the present invention in amounts of from about 25 wt % to about 35 wt %.

It is generally preferred that the present composites have an epoxy:reactive diluent weight ratio of from about 5:1 to about 30:1, more preferably from about 5:1 to about 20:1, and even more preferably from about 10:1 to about 15:1. Furthermore, applicants have found that unexpectedly superior results are generally achieved when the polymerizable epoxy compounds and the multi-functional acrylate compounds are present in an epoxy:acrylate weight ratio of from about 1.2:1 to about 5:1, more preferably from about 1.3:1 to about 4.3:1, and even more preferably from about 2:1 to about 3:1.

The curable composition may be dispensed using various methods known to those skilled in the art. For example, the composition may be dispensed using a dual cartridge device similar to a caulk gun, or the composition may be dispensed using a glass or film capsule. The composition may also be dispensed in bulk from bulk containers using meter-mix equipment, which is known to those skilled in the art. See, for example, U.S. Pat. Nos. 4,651,875, 4,706,806 and 4,729,696, the disclosures of which are hereby incorporated by reference. It is recognized that the amounts of the various components of the composition may vary depending on the type of dispensing system used. In preferred dispensing methods, the curable composition is formed by the mixing of a first composition and a second composition. Typically, the mixing occurs immediately before the curable composition is to be used. For example, when the composition is dispensed using a dispensing gun, the first composition and the second composition, which are contained in separate cartridges of the dispensing gun, may be mixed as they are ejected from the cartridges and applied to the surfaces to be bonded, such as to either the concrete or masonry and/or the anchoring device in the case of anchor compositions. Similarly, when the composition is dispensed using a glass capsule, the capsule is typically comprised of two chambers that contain the first composition and the second composition respectively. When the glass capsule is crushed, the two chambers are crushed and the contents are allowed to mix, forming the anchor composition. When the anchor composition is dispersed in bulk, a first composition and a second composition may be stored in separate bulk containers and combined through pumping with mixing in the appropriate ratio to make the curable composition.

In general, the epoxy-based adhesives of the present invention comprise epoxy and amine-based curing or hardening agent for the epoxy. As used herein, the term "curing agent" refers to one or more components which are capable of catalyzing and/or accelerating the polymerization and/or crosslinking reaction of the resin component, which in preferred embodiments comprises one or more epoxy compounds.

It is contemplated that the relative proportion of epoxy to amine in the curable composition may vary widely within the scope hereof in order to accommodate the needs and requirements of any particular application. In general, however, it is preferred that the reactive compositions of the present invention have a epoxy:amine weight ratio of from about 0.3:1 to about 4:1, more preferably from about 0.5:1 to about 2:1 and even more preferably from about 1:1 to about 2:1. In certain preferred embodiments, the reactive compositions of the present invention have an epoxy:amine weight ratio of from about 1:1 to about 1.5:1

The Epoxy

As used herein, the term "epoxy compound" refers to a compound or combination of two or more compounds that contain a reactive epoxy group or oxirane ring. Such materials, broadly called epoxides, include monomeric epoxy compounds and epoxides of the polymeric type and can be aliphatic, cycloaliphatic, aromatic or heterocyclic. These materials preferably have, on the average, at least 1.5 polymerizable epoxy groups per molecule, and even more preferably two or more epoxy groups per molecule. The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The epoxides may be pure compounds but are generally mixtures containing one, two, or more epoxy groups per molecule. The "average" number of epoxy groups per molecule is determined by dividing the total number of epoxy groups in the epoxy-containing material by the total number of epoxy molecules present.

The epoxy-containing materials may vary from low molecular weight monomeric materials to high molecular weight polymers and may vary greatly in the nature of their backbone and substituent groups. For example, the backbone may be of any type and substituent groups thereon can be any group free of an active hydrogen atom, which is reactive with an oxirane ring at room temperature. Illustrative of permissible substituent groups include halogens, ester groups, ethers, sulfonate groups, siloxane groups, nitro groups, phosphate groups, etc. The molecular weight of the epoxy-containing materials may vary widely, including in preferred embodiments from about 50 to 100,000 or more. Mixtures of various epoxy-containing materials can also be used in the compositions of this invention.

The epoxy compounds of the present invention may be cycloaliphatic epoxides. Examples of cycloaliphatic epoxides include diepoxides of cycloaliphatic esters of dicarboxylic acids such as bis(3,4-epoxycyclohexylmethyl)oxalate, bis8(3,4-epoxycyclohexylmethyl)adipate, bis(3,4-epoxy-6-methylcyclohexylmethyl)adipate, bis(3,4-epoxycyclohexylmethyl)pimelate, and the like. Other suitable diepoxides of cycloaliphatic esters of dicarboxylic acids are described in, for example, U.S. Pat. No. 2,750,395, which is incorporated herein by reference. Other cycloaliphatic epoxides include 3,4-epoxycyclohexylmethyl-3,4-epoxycyclohexane carboxylates such as 3,4-epoxycyclohexylmethyl-3,4-epoxycyclohexane carboxylate; 3,4-epoxy-1-methylcyclohexylmethyl-3,4-epoxy-1-methylcyclohexane carboxylate; 6-methyl-3,4-epoxycyclohexylmethyl-6-methyl-3,4-epoxycyclohexane carboxylate; 3,4-epoxy-2-88methylcyclohexylmethyl-3,4-epoxy-2-methylcyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate and the like. Other suitable 3,4-epoxycyclohexylmethyl-3,4-epoxycyclohexane carboxylates are described in, for example, U.S. Pat. No. 2,890,194, which is incorporated herein by reference.

There are a host of commercially available epoxy-containing materials, commonly known as epoxy resins, which can be used as the epoxy compound in this invention. In particular, epoxy compounds which are readily available include epoxy novalacs, diglyidyl ethers of bisphenol F, octadecylene oxide, glycidylmethacrylate, diglycidyl ether of bisphenol A (e.g., those available under the trade designations EPON 828, EPON 1004 and EPON 1010 from Shell Chemical Co., DER-331, DER-332, and DER-334, from Dow Chemical Co.), vinylcyclohexene dioxide (e.g., ERL-4206 from Union Carbide Corp.), 3,4-epoxycyclohexylmethyl-3,4-epoxycyclohexane carboxylate (e.g., ERL-4221 from Union Carbide Corp.), 3,4-epoxy-6-methylcyclohexylmethyl-3,4-epoxy-6-methylcyclohexene carboxylate (e.g., ERL-4201 from Unio2n Carbide Corp.), bis(3,4-epoxy-6-methylcyclohexylmethyl) adipate (e.g. ERL-4289 from Union Carbide Corp.), bis(2,3-epoxycyclopentyl)ether (e.g., ERL-0400 from Union Carbide Corp.), aliphatic epoxy modified with polypropylene glycol (e.g., ERL-4050 and ERL-4052 from Union Carbide Corp.), dipentene dioxide (e.g., ERL-4269 from Union Carbide Corp.), epoxidized polybutadiene (e.g., OXIRON 2001 from FMC Corp.), silicone resin containing epoxy functionality, flame retardant epoxy resins (e.g., DER-580, a brominated bisphenol type epoxy resin available from Dow Chemical Co.), 1,4-butanediol diglycidyl ether of phenolformaldehyde novolak (e.g., DEN-431 and DEN-438 from Dow Chemical Co.), and resorcinol diglycidyl ether (e.g., KOPOXITE from Koppers Company, Inc.), and combinations and mixtures of any of the above. Certain preferred embodiments utilize epoxy, which comprises a combination of diglyidyl ethers of bisphenol F and diglyidyl ethers of bisphenol A (e.g., those available under the trade designation DER-352, from Dow Chemical Co.).

Among the epoxy novalac resins, it is contemplated that a wide variety of such resins may be used in the adhesives of the present invention. In general, however, it is generally preferred that the epoxy novalac resins of the present invention have an average functionality of from about 2 to about 3, and even more preferably of about 2.5. Such resins also preferably have a weight per epoxide (WPE) as measured by ASTM D 1652 of from about 160 to about 190, more preferably of from about 165 to about 185, and even more preferably of from about 168 to about 178. Such resins also preferably have a viscosity at 25° C. of from about 300 to about 550 poise, more preferably of from about 320 to about 500, and even more preferably of from about 345 to about 485. A preferred epoxy novalac resin is sold by Resolution Performance Products under the trade designation EPON 160.

The use of epoxy resin, which comprises epoxy novalac, is generally preferred when it is desirable for the adhesive composition to perform well, especially in terms of pull out force, at relatively high temperatures. In certain of such high temperature embodiments, it is preferred that the composition produce a pullout force of at least 50 KN at about 80° C. In such embodiments, it is preferred that the epoxy resin comprise from about 20% by weight to about 60% by weight of epoxy novalac, more preferably from about 30% to about 50% by weight of epoxy novalac, and even more preferably from about 35% to about 45% epoxy novalac.

It is further contemplated that epoxy resins having a wide range of molecular weights and other characteristics are adaptable for use in accordance with the present invention. It is generally preferred, however, that the epoxy resins of the present invention possess an epoxy equivalent weight (EEW) of from about 180 to about 192. Furthermore, it is generally preferred that the epoxy resins have a viscosity of from about 6,000 to about 14,000 cps at about 25° C.

The epoxy resins suitable for use in the present invention may thus comprise one or more compounds, such as epoxy prepolymers, having more than one epoxide group per molecule available for reaction with the curing agent of the present invention. Such epoxy prepolymers include but are not limited to polyglycidyl ethers of polyvalent phenols, for example pyrocatechol, resorcinol, hydroquinone; 4,4'-dihydroxydiphenyl methane; 4,4'-dihydroxy-3-3'-dimethyldiphenyl methane; 4,4'-dihydroxydiphenyl dimethyl methane; 4,4'dihydroxydiphenyl methyl methane; 4,4'-dihydroxydiphenyl cyclohexane; 4,4'-dihydroxy-3,3'-dimethyldiphenyl propane; 4,4'-dihydroxydiphenyl sulfone; or tris-(4-hydroxyphenyl)methane; polyglycidyl ethers of novalacs (i.e., reaction products of monohydric or polyhydric phenols with aldehydes, formaldehyde in particular, in the presence of acid catalysts); polyglycidyl ethers of diphenols obtained by esterifying 2 mols of the sodium salt of an aromatic hydrocarboxylic acid with 1 mol of a dihaloalkane or dihalogen dialkyl ether; and polyglycidyl ethers of polyphenols obtained by condensing phenols and long-chain halogen paraffins containing at least two halogen atoms.

Further epoxy-containing materials which are particularly useful in the practice of this invention, particularly as reactive diluent for the epoxy portion of the resin, include glycidyl ether ether monomers as disclosed in U.S. Pat. No. 5,385,990, which is incorporated herein by reference.

It is contemplated that one or more epoxy compounds as described above are readily adaptable for use within the scope of the present invention. In certain highly preferred embodiments the epoxy compound comprises in major proportion, and even more preferably is comprised of at least about 80% by weight of difunctional bisphenol A/epichlorohydrin derived liquid epoxy resin having a epoxide equivalent weight of from about 180 to about 200, and even more preferably from about 185 to about 195. In other highly preferred embodiments the epoxy compound comprises in major proportion, and even more preferably is comprised of at least about 80% by weight, and even more preferably consists essentially of a liquid epoxy formed by the reaction product of epichlorohydrin with bisphenol-A and bisphenol-F having a epoxide equivalent weight of from about 160 to about 200, and even more preferably from about 170 to about 185. As used herein, epoxide equivalent weight means the grams of epoxy compound or resin containing one gram equivalent of epoxide, as determined by the Shell Analytical Method HC-427D-89 (perchloric acid method). Certain preferred epoxies also preferably have a viscosity at 25° C. of from about 100 to about 175 poise, and even more preferably from about 110 to about 150 poise, as measured by Shell Analytical Method HC-397A-87. Such a preferred epoxy resin, which satisfies these requirements is available from Shell Resins under the trade designation EPON Resin 828. Certain other preferred epoxies preferably have a viscosity at 25° C. of from about 5000 to about 6000 mPa·s, and even more preferably from about 5400 to about 5900 mPa·s, as measured by ASTM D-445. Such a preferred epoxy resin, which satisfies these requirements is available from Dow Plastics under the trade designation D.E.R. 352. In preferred embodiments, reactive diluents are incorporated into the epoxy resin to, inter alia, control the flow characteristics of the adhesive composition. Suitable reactive diluents preferably have at least one reactive terminal end portion (including an epoxy group), and even more preferably also have a saturated or unsaturated cyclic backbone. Preferred reactive terminal ether portions include glycidyl ether and vinyl ether. Examples of suitable reactive diluents include: 1,4-butanediol diglycidyl ether; 1,4-cyclohexane-dimethanol; the diglycidyl ether of resorcinol; diglycidyl ether of cyclohexane dimethanol; diglycidyl ether of neopentyl glycol; triglycidyl ether of trimethylolpropane dipentene; and the divinyl ether of cyclohexanedimethanol. Commercially available reactive diluents include "WC-68" from Rhone Poulenc, Epodil 741, 749 and 757 from Air Products and Chemicals Incorporated (Allentown, Pa.), Rapi-cure, a divinyl ether of cyclohexanedimethanol available from Allied-Signal Corp. of Morristown, N.J., and glycidyl neodeconate sold under the tradename CADURA E-10 by Shell Oil. Highly preferred for use in the epoxy resin as a reactive diluent is the 1,4-butanediol diglycidyl ether sold by Air Products under the trade designation Epodil 750.

In preferred embodiments of the present invention, the epoxy comprises, and preferably consists essentially of, epoxy resin and reactive diluent. In such embodiments, it is preferred that the epoxy resin:reactive diluent weight ratio is from about 11:1 to about 13:1, and even more preferably about 12:1. In highly preferred embodiments, the epoxy resin comprises from about 90% by weight to about 98% by weight of epoxy and from about 2% by weight to about 10% by weigh of reactive diluent. In certain preferred embodiments, the epoxy resin comprised about 93% by weight of epoxy (preferably EPON 828) and about 3% by weight of reactive diluent (preferably Epodil 750).

The Reactive Multifunctional Acrylate

As mentioned above, one of the important active components of the present invention is the reactive multifunctional acrylate. It is contemplated that numerous compounds are adaptable for use as the reactive multifunctional acrylate of the present invention, and all such compounds are useful within the broad scope of the present invention. In certain preferred embodiments, the multifunctional acrylate comprises, and preferably consists essentially of, multifunctional methacrylate compounds.

In highly preferred embodiments, the reactive multifunctional acrylate comprises at least one compound that is at least tri-functional, and in certain embodiments at least one compound that is at least tetra-functional, and ever more preferable a combination of at least one of each. Of course, the reactive multifunctional acrylate of the present invention may comprise a combination of two or more multi-functional acrylate compounds, with each independently having the same or different levels of functionality. In certain embodiments, the multi-functional acrylate consists essentially of compounds that are tri- and tetra-functional. A preferred tri-functional acrylate is trimethylolpropane triacrylate, which is sold under the trade designation SR-351 by Sartomer Company of Exton, Pa., USA. A preferred penta-functional acrylate is dipentaerythritol pentaacrylate, which is sold under the trade designation SR-399 by Sartomer Company of Exton, Pa., USA. Each of these preferred multi-functional acrylates includes inhibitor, particularly methyl hydroquinone, in a concentration of less than about 100 ppm based on the total weight of the acrylate and inhibitor.

Although applicants do not intend to be bound by or to any particular theory of operation, it is believed that the reactive multifunctional acrylates of the present invention act to provide numerous and effective cross-linking sites for the adhesive composition as it cures, thus improving the density and other physical properties of the cured adhesive, such as pull out strength and fire resistance.

The relative amount of the different types and functionalities of reactive multifunctional acrylate included in the present compositions may vary widely depending on numerous factors, such as for example the desired cure rate and strength, as well as the type and nature of the other components of the composition. Nevertheless, the preferred embodiments of the present adhesive compositions comprise tri- and penta-functional acrylates in a tri:penta weight ratio of from 0.05:1 to about 1:1, more preferably from about 0.08:1 to about 0.5:1, and even more preferably from about 0.1:1 to about 0.4:1.

The Curing Agent

Although it is contemplated that, in general, the present invention can include any one of known and available curing agents, it is generally preferred that the curing agent compromise an amine-curing agent. The amine curing agent of the present invention may be any substance known as an amine-type curing agent for epoxy resins; it is generally preferred, however, that the curing agent comprise, and preferably consist essentially of, a mixture of aliphatic amines.

In certain preferred embodiments, the amine(s) include, on average, greater than two hydrogen atoms active towards the epoxide resin. The amines can contain one or more primary, secondary or tertiary nitrogen atoms.

Examples of suitable amines are aliphatic, cycloaliphatic, aromatic and heterocyclic amines, such as bis-(4-aminophenyl)-methane, aniline/formaldehyde resins, benzylamine, octylamine, propane-1,3-diamine, 2,2-dimethyl-1,3-propanediamine(neopentanediamine), hexamethylenediamine, diethylenetriamine, bis(3-aminopropyl)-amine, N,N-bis(3-aminopropyl)-methylamine, triethylenetetraamine, tetraethylenepentaamine, pentaethylenehexaamine, 2,2,4-trimethylhexane-1,6-diamine, m-xylylenediamine, 1,2- and 1,4-diaminocyclohexane, bis-(4-aminocyclohexyl)-methane, bis-(4-amino-3-methylcyclohexyl)-methane, 2,2-bis-(4-aminocyclhexyl)propane and 3-aminomethyl-3,5,5-trimethylcyclohexylamine(isophoronediamine), polyaminoimidazolines and polyaminoamides, for example those obtained from aliphatic polyamines and dimerized or trimerized fatty acids. One particularly preferred type of amine is the class of amines modified by condensation reactions, known as Mannich bases. One particularly preferred Mannich base is the aliphatic Mannich base made by Air Products under the trade designation Ancamine 1856. Another type of preferred amines are the adduct modified aliphatic amines, with three such amines being available from Air Products under the trade designations Ancamine 1768, Ancamine 1638 and Ancamine 2089M. Suitable amines also include the polyoxyalkyleneamines, known as Jeffamines, made by Hunstman Chemical, for example the Jeffamines EDR 148, D 230, D 400, or T 403, xylene diamine and bis(aminocyclohexyl) methane. Among the cycloaliphatic amines, methylene-di (cyclohexyl)amine (also known as PACM), 3-aminomethyl-3,5,5-trimethyl-cyclohexylamine (alternatively 5-amino-1,3, 3-trimethyl-cyclohexanemethylamine) (also known as isophoronediamine or IPDA) are preferred. Other curing agents include, for example, polyamines and polyamide curing agents.

For preferred embodiments in which the curing agent comprises at lease one Mannich amine and at least one adduct modified amine, it is preferred that the Mannich:adduct modified amine are present in a weight ratio of from about 0.5:1 to about 3:1, more preferably from about 0.5:1 to about 2:1, and even more preferably from about 1:1 to about 2:1. In such embodiments, it is also generally preferred that the aliphatic amine compound(s) have a glass transition temperature, when cured with an epoxy, of from about 125° F. to about 140° F., and even more preferably from about 125° F. to about 135° F., and an amine value of at least about 350 mg KOH/g, more preferably of from about 350 mg KOH/g to about 1500 mg KOH/g. In certain preferred embodiments, it is preferred to use a combination of at least two amine compounds wherein a first of said compounds has an amine value of from about 800 to about 1500 mg KOH/g and at least a second amine compound has an amine value of from about 350 to about 800 mg KOH/g, and even more preferably from about 380 mg KOH/g to about 550 mg KOH/g. As used herein, the "glass transition temperature" refers to the property as measured by ASTM D3418-82.

It is contemplated that the amine-curing agent may be present in a wide variety of concentration ranges within the broad scope of the present invention. Preferably, however, the present compositions comprise from about 10 wt % to about 55 wt % of amine curing agent, more preferably from about 10 wt % to about 40 wt % and even more preferably from about 10 wt % to about 30 wt %. Furthermore, applicants have found that unexpectedly superior results are generally achieved when the amine curing agent is present in the adhesive compositions in amounts of from about 20 pbwa to about 70 pbwa, and even more preferably from about 25 pbwa to about 40 pbwa.

The use of curing agent, which comprises one or more cycloaliphatic amines is generally preferred when it is desirable for the adhesive composition to perform well, especially in terms of pull out force, at relatively high temperatures. In certain of such high temperature embodiments, it is preferred that the composition produce a pull out force of at least 50KN at about 80° C. In such embodiments, it is preferred that the curing agent comprise from about 25% by weight to about 50% by weight of cycloaliphatic amines, more preferably from about 30% to about 40% by weight of cycloaliphatic amines, and even more preferably about 35% cycloaliphatic amines.

Inhibitor

Inhibitors, and particularly free-radical inhibitors, are known to those skilled in the art. A preferred free-radical inhibitor is hydroquinone. Other suitable free-radical inhibitors include, but are not limited to, trimethylhydroquinone, hydroquinone monomethyl ether, t-butyl catechol and naphthaquinone. It is also contemplated that more than one free radical inhibitor may be employed in the anchor composition. The polymerization inhibitor preferably comprises, more preferably comprises in major proportion, and even more preferably consists essentially of hydroquinone. Of course other inhibitors may be used alone or in combination with hyrdoquinone, such as for example, parabenzoquinone, methylhydroquinone, catechol and the like which are conventionally employed as polymerization inhibitors.

While it is contemplated that the amount of inhibitor in the composition may vary widely depending on numerous factors particular to each application and contemplated use, it is generally preferred that the inhibitor is present in amounts of from about 0.005 wt % to about 0.5 wt %, and even more preferably from about 0.01 wt % to about 0.1 wt %.

Initiator

In some embodiments, the resin composition of this invention can be more easily cured by adding a curing catalyst, an initiator, or both. Representative initiators include aldehyde-amine condensation product, organic sulfonyl chlorides and tertiary amines, with tertiary amines being generally preferred. In certain preferred embodiments, the initiator comprises an amino substituted phenol, more preferably a tertiary amino substituted phenol, and even more preferably a phenol having at least two and preferably three tertiary amine substituents. One preferred tertiary amine is 2,4,6-tris(dimethylaminomethyl)phenol available from Air Products under the trade designation ANCAMINE K54. Of course, two or more different activating agents can be used in combination in accordance with the present invention. Other suitable activators are tertiary amines such as N,N-dimethyl aniline, N,N-dimethyl toluidine, N,N-diethylaniline, N,N-diethyl toluidine, N,N-di-(2-hydroxy-ethy)-p-toluidine, N,N-bis(2-hydroxyethyl)-p-toluidine, N,N-bis(hydroxypropyl)-p-toluidine and the like. The curing catalysts may in certain embodiments also include organic peroxides such as methylethylketone peroxides, t-butyl peroxybenzoates, benzoyl peroxides, dicumyl peroxides and the like.

Thixotroptic Agents

The present anchor composition may also comprise a thixotropic agent. The preferred thixotropic agent of the present invention causes the composition to become more fluid, i.e. less viscous, when agitated, stirred or mixed or otherwise subjected to such shear forces. It is useful to include a thixotropic agent in the anchor composition to insure that the composition has the desired viscosity during application and after the composition is applied. For example, thixotropic agent may be added to inhibit or prevent slump or sag of the composition when the application may require injecting the composition into a horizontal hole or a hole in the ceiling. In addition, a thixotropic agent may be added to an anchor composition to prevent the settling of other solid components of the composition and to increase the viscosity of the composition. The thixotropic agent also facilitates dispensing of the composition because when a shear force is applied, e.g. expulsion of the composition from a dispensing gun, the thixotropic agent makes the resulting composition less viscous, and therefore, more easy to expel from the cartridges of the dispensing gun. The thixotropic agent may be found in the anchor composition in an amount in the range of from about 0.5 wt % to about 10 wt %, and more preferably from about 1 wt % to about 5 wt %. Typically, the use of thixotropic agent is not needed when the anchor composition is dispensed using a glass capsule. An example of a suitable preferred thixotropic agent is fumed silica. Also contemplated are the various silicas made by the various methods known in the art, including pyrolysis of silicon tetrachloride and precipitation. Other suitable thixotropic agents include the various organoclays and various fibers. In some anchor compositions, the thixotropic agent may also be considered a filler. A suitable silica thixotropic agent is Aerosil.® R202, which may be obtained from the Degussa Corporation of Ridgefield Park, N.J. It is also contemplated that more than one thixotropic agent may be used in the anchor composition Fillers The anchor composition of the present invention also preferably comprises one or more fillers. Fillers are typically added to compositions for various reasons, including to reduce shrinkage of the composition that may occur during polymerization and to reduce the cost of the composition, as fillers replace a portion of the more expensive components of the anchor composition. The filler may also provide for improved bond strength of the anchor composition when polymerized and help to prevent the settling out of other particulate materials in the composition. Generally, the filler is an inert, inorganic, solid, particulate compound. By inert it is meant that the filler does not detrimentally interact with any other component of the composition. Examples of suitable fillers include, but are not limited to, crushed glass, glass beads, quartz, silica, limestone, alumina, various clays, diatomaceous earth and other materials such as mica, flint powder, kryolite, alumina trihydrate, talc, sand, pyrophyllite, blanc fixe, granulated polymers such as polyethylene, hollow glass and polymer beads, zinc oxide, novaculite, calcium sulfate and mixtures thereof. Preferred fillers are quartz, glass and silica. Fillers may be treated with coupling agents to improve bonding to the polymer matrix. Examples of coupling agents, which may be used to treat the fillers are silanes, titanates and zirconates.

Preferably, the present compositions contain fillers an amount of from about 10% to about 80% by weight of the composition, more preferably from about 20 wt % to about 70 wt %, and even more preferably from about 20 wt % to about 50 wt %.

The exact particle size of the filler will depend on the desired consistency of the composition and the method for dispensing the anchor composition. For example, fillers having a large average particle size (300 microns and larger) may clog static mixers that are used in dispensing systems such as dispensing guns. On the other hand, fillers having a large particle size can be used in glass capsules. Preferred particle sizes are about 50 microns or larger. However, in cases where a filler is used to prevent the settling out of other particulate matter in a composition, a particle size smaller than 50 microns may be desired. It is also recognized that filler having a particle size less than 50 microns may be used in combination with other fillers, some having particle sizes greater than 50 microns.

Other Additives

The anchor composition may also contain a fragrance. A fragrance is used in an anchoring composition to mask any odor of the composition that is thought undesirable or unpleasant. A preferred fragrance is Atlanta Fragrance 16332. Similarly, a pigment may be employed to color the anchoring composition. Suitable pigments are known to those skilled in the art.

Preferred Two Component Adhesives

In one embodiment of the present invention, the anchor composition is formed by mixing a first composition and a second composition. The first composition contains the epoxy compound and preferably also at least a substantial amount, and preferably substantially all of the reactive diluent if present. The first composition also preferably contains the multifunctional acrylate, which itself preferably contains an inhibitor to inhibit curing of the adhesive until desired, the second composition preferably contains an amine catalyst. When the first composition and the second composition are combined, polymerization occurs.

In a preferred embodiment, the first composition comprises epoxy resin, multifunctional acrylate accelerator and filler. The first composition may also comprise a thixotropic agent, a chain transfer agent, a free-radical inhibitor, a fragrance, an activator, a promoter and/or a pigment. The second composition may also include a filler, a thixotropic agent, a fragrance, and/or a pigment. It is also contemplated that both the first composition and the second composition may contain some of the same components.

The weight ratio of the first composition to the second composition may be in the range of 0.5 to 1 to about 2 to 1. Preferably, the weight ratio of the first composition (Part A) to the second composition (Part B) is about 1.5 to 1.

EXAMPLES

The following examples are provided to illustrate particular embodiments of the invention and are not intended to limit the scope of the invention or the claims in any manner.

Experimental Protocols

Preparation of Two Part Anchor Compositions

The appropriate amounts of polymerizable epoxy resin are prepared. To the resin is add the appropriate amount of multifunctional acrylate, reactive diluent and other ingredients. The composition is mixed, preferably using a dispenser. Next, the thixotropic agent is added with shear mixing followed by addition of the filler. If more than one filler is to be included in the anchor composition, it is preferable to add the first filler, then mixed, then added to the second filler and so on until the desired number of fillers have been added to the composition until Part A of the composition is complete. The same general procedure as described above is used to make Part B consisting of curing agent, thixotropic agent, activator filler, pigment and other ingredients.

The above preparation procedure is used for the examples, except for the comparative example, in which case the adhesive was prepared in accordance with the instructions provided.

Pull Out Performance and Torque Resistance

A medium weight concrete block approximately 4"×0.8"× 16" substantially free of surface moisture is used. Typically, five replicate pull out and torque resistance tests are run for each adhesive composition tested. First, three equally spaced 110 mm deep holes approximately 14 mm wide are drilled in the 8"×16" side of the concrete block. Then, the holes are cleaned with a brush, with compressed air and a vacuum. An adhesive composition is injected into the drilled holes, and a ¼"-20 threads per inch.×12 mm stainless steel rod type 304 is inserted into the adhesive-containing hole with a twisting motion. The time before pull out and torque testing is in the range of about 0.5 hours to about 72 hours, as reported. For the torque resistance test, the stainless steel rod is torqued, and the amount of torque required to begin rotation of the rod is recorded. In torqued pull-out tests, the stainless steel rod after the torque resistance is measured is then connected at the indicated time to a universal tester, such as an Instron universal tester, Model TTC, Instron Corporation, Canton, Mass. or its equivalent, and the rods are pulled at 0.2"/minute until failure. The maximum load and failure type was then recorded. Pullout tests which are not torqued are measured in the same manner, except the torquing operation is omitted.

One measure of real word performance of anchor adhesives is the torqued pull out force of the adhesive. This measure is in certain ways representative of actual conditions at a construction site since it would not be unexpected for anchor bolts, for example, to be twisted or otherwise torqued by a construction worker, either intentionally or unintentionally, after the adhesive is applied but before the adhesive has had a chance to fully cure.

The preferred anchor compositions of the present invention provide a torque resistance at about 1 hour after application at about room temperature of at least about 15 N-m, and at torqued pullout performance about 24 hours at about room temperature of at least about 65 KN.

Most preferably, the material that has been anchored to the concrete or masonry, or the concrete or masonry itself fails before the adhesive composition. As can be seen from the following examples, the compositions of the present invention are capable of achieving a torque resistance at one hour at room temperature of at least about 15 N-m, and a pull out performance (without torquing) at about 24 hours at about room temperature of at least about 90 KN and at about 24 hours at about 80° C. of at least about 45 KN.

Comparative Example

A leading commercially available, epoxy-based anchor adhesive sold under the trade designation RE-500 by Hilti Aktiengesellschaft of Schaan, Liechtenstein is used in accordance with the instructions provided to measure various performance parameters as outlined in the above protocols. The following results are observed:

| Adhesive | RE-500 |
| --- | --- |
| Torque Resistance, 1 Hr. (N-m) | 0 |
| Pullout, 5 Hr. (no torque) (KN) | 47 |
| Pullout, 6 Hr. (no torque) (KN) | 84 |
| Pullout, 24 Hr.(no torque) (KN) | 90 |
| Pumpability - | good |

The RE-500 product had no measurable torque resistance up to six hours after application at room temperature.

Example 1

A two part adhesive composition having a Part A:Part B weight ratio of 1.5:1 and the following formulations for Part A and Part B is prepared and used according to the above protocols:

Part A

| COMPONENT | Wt. % in Part A | Wt % in A + B | pbwa |
| --- | --- | --- | --- |
| Epoxy resin (Epon 828) | 59.21 | 27.33 | 48.96 |
| Accelerator (SR399)* | 19.51 | 9.00 | 16.13 |
| Accelerator (SR351)** | 4.88 | 2.25 | 4.04 |
| Reactive Diluent (Epodil 750) | 4.88 | 2.25 | 4.04 |
| Thixotropic Agent (R202) | 2.44 | 1.13 | 0 |
| Filler (Sand) | 9.07 | 4.19 | 0 |
| Pigment | 0.01 | 0.02 | 0 |

*includes 270 ppm me HQ
**includes 125 HQ and 175 me HQ

Part B

| COMPONENT | Wt. % in Part B | Wt % in A + B | pbwa |
| --- | --- | --- | --- |
| Curing Agent (AN1856) | 24.61 | 7.57 | 13.57 |
| Curing Agent (AN1768) | 18.11 | 5.57 | 9.98 |
| Activator (ANCK54) | 4.67 | 1.44 | 2.57 |
| Accelerator (DETA) | 1.29 | 0.40 | 0.71 |
| Thixotropic Agent(Aerosil R202) | 3 | 0.92 | 0 |
| Filler (Sand) | 48.32 | 14.87 | 0 |

The various performance parameters as outlined in the above protocols are measured for the adhesive composition and the following results are observed:

Torque Resistance, 1 Hr. (N-m)—21

Pullout, 3 Hr. (no torque) (KN)—76

Pullout, 24 Hr. (no torque) (KN)—91.4*

Pullout, 24 Hr (with torque) (KN)—67.3

Pumpability—good

*—rod/concrete failure

As can be seen from a comparison of the above example with the comparative example, the present composition is capable of producing its maximum strength of about 100 KN approximately four hours after application, while a full five hours after application the prior art product is well below its maximum strength and substantially below the strength of the present composition. Moreover, the present composition is capable of generating significant torque resistance only 1 hour after application, while the prior art product produces no substantial torque resistance even after six hours.

Example 2

A two part adhesive composition having a Part A:Part B weight ratio of 1.5:1 and the following formulations for Part A and Part B is prepared and used according to the above protocols:

Part A

| COMPONENT | Wt. % in Part A | Wt % in A + B | pbwa |
| --- | --- | --- | --- |
| Epoxy resin (Epon 828) | 38.53 | 17.38 | 13.80 |
| Epoxy resin (Epon 160) | 25.68 | 12.02 | 9.55 |
| Accelerator (SR399)* | 17.12 | 7.84 | 6.22 |
| Accelerator (SR351)** | 5.00 | 2.29 | 1.82 |
| Reactive Diluent (Epodil 750) | 0 | 0 | 0.0 |
| Thixotropic Agent (R202) | 3.5 | 1.6 | 0 |
| Filler (Sand) | 11.00 | 5.04 | 0 |
| Pigment | 0.0 | 0.0 | 0 |

*includes 270 ppm me HQ
**includes 125 HQ and 175 me HQ

Part B

| COMPONENT | Wt. % in Part B | Wt % in A + B | pbwa |
| --- | --- | --- | --- |
| Curing Agent (AN1856) | 23.61 | 7.21 | 5.72 |
| Curing Agent (PACM) | 9.6 | 2.93 | 2.33 |
| Activator (ANCK54) | 2.43 | 0.74 | 0.59 |
| Accelerator (IPDA) | 3.98 | 1.22 | 0.96 |
| Thixotropic Agent(Aerosil R202) | 2.5 | 0.76 | 0 |
| Filler (Sand) | 58.55 | 17.88 | 0 |

The various performance parameters as outlined in the above protocols are measured for the adhesive composition and the following results are observed:

Torque Resistance, 1 Hr. (N-m)—15

Pullout, 24 Hr. (no torque) (KN)—97

Pullout, 24 Hr. (no torque)@80 C (KN)—54

Pumpability—good

As can be seen from a comparison of the above example with the comparative example, the present composition is capable of producing a pull out force of 54 KN at about 80° C.

The invention claimed is:

1. A curable adhesive composition for anchoring materials in or to concrete or masonry comprising:
    a curable epoxy resin;
    from about 5 parts by weight based on active components participating in the curing of the composition to about 30 parts by weight based on active components participating in the curing of the composition of reactive multifunctional acrylates comprising at least two different multifunctional acrylates, wherein one of the at least two different multifunctional acrylates consists of three acrylate functionalities and the other of the at least two different multifunctional acrylates consists of five acrylate functionalities, the weight ratio of said curable epoxy resin to said multifunctional acrylates being from 1.2:1 to about 5:1 and the weight ratio of the multifunctional acrylate consisting of three acrylate functionalities to the multifunctional acrylate consisting of five acrylate functionalities being in the range from 0.05:1 to 1:1; and
    curing agent.

2. The adhesive composition of claim 1 wherein said curable epoxy resin is provided in an amount of from about 10 wt % to about 50 wt % of the composition.

3. The adhesive composition of claim 2 wherein said reactive multifunctional acrylate comprises multifunctional methacrylate.

4. The adhesive composition of claim 2 wherein said reactive multifunctional acrylate consists essentially of multifunctional methacrylate.

5. The adhesive composition of claim 1 characterized in that the composition has a pull out performance after 24 hours at 72° F. of at least 85 KN.

6. The adhesive composition of claim 1 wherein the weight ratio of said curable epoxy resin to said multifunctional acrylates is in the range from 2.4:1 to 4.3:1.

7. The adhesive composition of claim 1 wherein the weight ratio of said curable epoxy resin to said multifunctional acrylates is in the range from about 3:1 to about 5:1.

8. The adhesive composition of claim 1 wherein the multifunctional acrylate consisting of three acrylate functionalities is trimethylol propane triacrylate and the multifunctional acrylate consisting of five acrylate functionalities is dipentaerythritol pentaacrylate.

9. The adhesive composition of claim 2 characterized in that the composition has a pull out performance after 24 hours at 72° F. of at least 85 KN.

10. The adhesive composition of claim 6 characterized in that the composition has a pull out performance after 24 hours at 72° F. of at least 85 KN.

11. The adhesive composition of claim 8 characterized in that the composition has a pull out performance after 24 hours at 72° F. of at least 85 KN.

12. The adhesive composition of claim 1, wherein the weight ratio of the multifunctional acrylate consisting of three acrylate functionalities to the multifunctional acrylate consisting of five acrylate functionalities is in the range from 0.08:1 to 1:1.

13. The adhesive composition of claim 1, wherein the weight ratio of the multifunctional acrylate consisting of three acrylate functionalities to the multifunctional acrylate consisting of five acrylate functionalities is in the range from 0.1:1 to 0.4:1.

14. The adhesive composition of claim 1, wherein the weight ratio of said curable epoxy resin to said multifunctional acrylate is in the range from 2:1 to 5:1.

15. The adhesive composition of claim 1, wherein the reactive multifunctional acrylates in the composition consist essentially of two different multifunctional acrylates, wherein one of the two different multifunctional acrylates consists of three acrylate functionalities and the other of the two different multifunctional acrylates consists of five acrylate functionalities.

* * * * *